Feb. 16, 1971  H. R. BRAND  3,562,943

MIRROR FRAME AND MOUNTING

Filed March 18, 1969

INVENTOR.
HARRY RUSSELL BRAND
BY
*Alfred W. Barber*
ATTORNEY

United States Patent Office 3,562,943
Patented Feb. 16, 1971

---

3,562,943
MIRROR FRAME AND MOUNTING
Harry Russell Brand, 62 S. Bay Drive,
Massapequa, N.Y. 11758
Filed Mar. 18, 1969, Ser. No. 808,226
Int. Cl. G09f 1/12
U.S. Cl. 40—152.1                3 Claims

ABSTRACT OF THE DISCLOSURE

Simple folded metal parts are assembled into improved mirror frame and mounting.

BACKGROUND OF THE INVENTION (1) Field of the invention

The present invention relates to Optics, Class 88 and Mirrors and Reflectors, Frames and Holders, Sub-class 96.

(2) Description of prior art

Mirror frames and mountings, particularly adapted for commercial use, require rugged construction and flexible hanging provisions. Simplicity leading to reliability and low cost are important practical considerations. The present mirror frame and mounting fulfills these requirements.

SUMMARY

The present invention is a mirror frame and mounting constructed of sheet metal parts fabricated and formed by simple bending and spot welding. The frame comprises a sheet metal angle bent into a rectangular frame and held together by spot welding at one corner. The rear edge along two sides is folded over to form a lip. The mounting comprises four metal strips spot welded to form a rectangle. The ends of two of the strips are folded over. Two folded metal strips serve as connecting members between the frame lips and the folded ends of the mounting strips. Two screws passing through the folded strip ends serve to tension the assembly. The four strips are pierced to provide means for hanging the framed mirror.

DESCRIPTION OF THE PREFERRED EMBODIMENT

Figure 1:
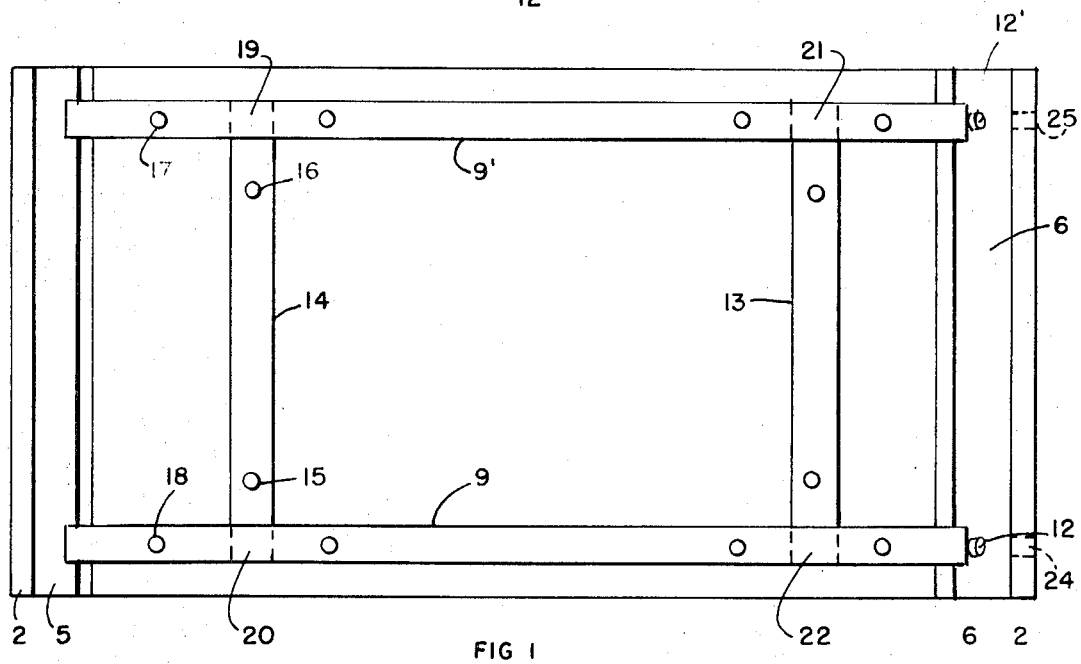
FIG. 1 is a rear view of the mirror frame and mounting in accordance with the present invention.

FIG. 1 is a rear view of the mirror frame and mounting including frame 1 turned over to form a lip 2 at one side and 2' at the opposite side. Mounting strips 9, 9', 13 and 14 are assembled in rectangular form by suitable means such as spot welding at intersections 19, 20, 21 and 22. These strips are perforated at predetermined points suitable for hanging the framed mirror as at 15, 16, 17 and 18. The mounting frame is connected with or coupled to the mirror frame by formed sheet metal strips 5 and 6. Tension is applied to form a rigid assembly by means of screws 12 and 12' passing through the ends of mounting strips 9 and 9' and pressing into coupling strip 6. Access to these screws may be through openings 23 and 24 in frame 1 and strip 6.

Figure 2:
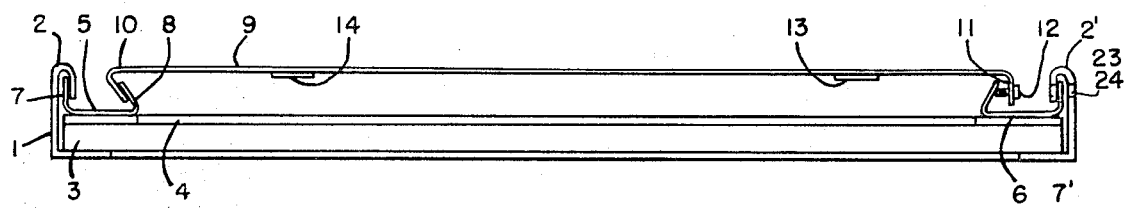
FIG. 2 is a cross-sectional view of the form of the invention shown in FIG. 1.

FIG. 2 is a cross-sectional view showing mirror 3 pressed between the front flanges of frame 1 and strips 5 and 6 under the urging of mounting strips 9 and 9' as tension is applied by the pressure of screws 12 and 12' against backing plate 4. Details of the lips 2 and 2' for receiving edges 7 and 7' of strips 5 and 6 are also shown. The folded ends of strips 9 and 9' at 10 and 11 are also shown together with the tensioning screws 12 and 12' pressing against the folded edge of coupling strip 6. Screws 12 and 12' may be reached through holes 24 and 25 passing through the ends of frame 1 and strip 6 for easy removal of frame 1. It will be seen from the showing in FIGS. 1 and 2 and the above description that the mirror frame and mounting in accordance with the present invention is simple, rugged and effective. It is constructed of easily fabricated and inexpensive parts.

Figure 3:
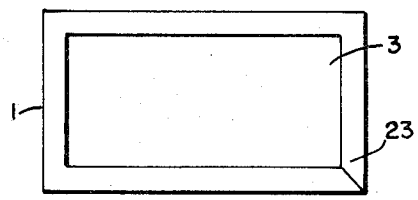
FIG. 3 is a front view of the frame of FIG. 1.

FIG. 3 is a front view of frame 1 holding mirror 1. Frame 1 may be of folded metal and completed by simple seam welding as along a diagonal corner line 23.

Figure 4:
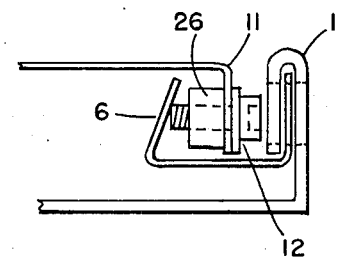
FIGS. 4 and 5 are details of the mounting screws.

FIG. 4 is a detail of a preferred form of mounting screw holder 26 which is a threaded bushing swaged to lip 11 to prevent turning when screw 12 is turned.

Figure 5:
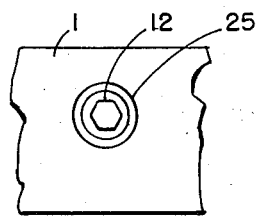

FIG. 5 is a detail showing how screw 12 is accessable through hole 25 in frame 1.

It will be seen that with mounting frame 9-9' mounted against a wall, frame 1 and mirror 3 may be removed simply by removing screws 12-12' and without disturbing mounted frame 9-9'.

I claim:
1. In a mirror frame, the combination of;
   a rectangular metal frame including reentrant lips at one end and tensioning screw tapped members at the other end for mounting against a wall;
   a rectangular frame for holding a mirror to be mounted including turned over lip members at each end;
   U-channel coupling members for coupling said turned over lip members to said reentrant lips at one end and for providing bearings for said screw tensioning members at the other end;
   whereby a mirror may be mounted in said frame and tensioned against said frame by means of screws secured in said tapped members.
2. A mirror frame as set forth in claim 1; and including mounting holes in said rectangular metal frame.
3. A mirror frame as set forth in claim 1; wherein said rectangular metal frame is formed from a plurality of straight metal strips welded together.

References Cited

UNITED STATES PATENTS

| | | | |
|---|---|---|---|
| 911,568 | 2/1909 | Bickford | 248—490 |
| 1,209,560 | 12/1916 | Cosner | 248—488 |
| 1,908,147 | 5/1933 | Hoegger | 248—489 |
| 2,928,199 | 3/1960 | Novak | 40—152.1 |

ROBERT W. MICHELL, Primary Examiner

W. J. CONTRERAS, Assistant Examiner